(12) United States Patent
Guo et al.

(10) Patent No.: US 10,003,842 B2
(45) Date of Patent: *Jun. 19, 2018

(54) AUTO VIDEO PREVIEW WITHIN A DIGITAL MAGAZINE

(71) Applicant: Flipboard, Inc., Palo Alto, CA (US)

(72) Inventors: Meng Guo, San Jose, CA (US); Lei Zheng, Saratoga, CA (US)

(73) Assignee: Flipboard, Inc., Palo Alto, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/830,452

(22) Filed: Dec. 4, 2017

(65) Prior Publication Data

US 2018/0091840 A1 Mar. 29, 2018

Related U.S. Application Data

(63) Continuation of application No. 15/064,384, filed on Mar. 8, 2016, now Pat. No. 9,866,887.

(51) Int. Cl.
*G06F 3/00* (2006.01)
*G06F 13/00* (2006.01)
*H04N 5/445* (2011.01)
*H04N 21/2668* (2011.01)
*H04N 21/8547* (2011.01)
(Continued)

(52) U.S. Cl.
CPC ... *H04N 21/2668* (2013.01); *H04N 21/23424* (2013.01); *H04N 21/4532* (2013.01); *H04N 21/812* (2013.01); *H04N 21/8547* (2013.01); *H04N 2201/325* (2013.01)

(58) Field of Classification Search
CPC ......... H04N 21/2668; H04N 21/23424; H04N 21/4532; H04N 21/812; H04N 21/8547
See application file for complete search history.

(56) References Cited

U.S. PATENT DOCUMENTS 9,866,887 B2* 1/2018 Guo .................. H04N 21/2668
2003/0126604 A1* 7/2003 Suh .................. G06F 17/30814
725/38
(Continued)

OTHER PUBLICATIONS

PCT International Search Report and Written Opinion for PCT/US17/18664, dated Mar. 16, 2017, 10 Pages.
(Continued)

*Primary Examiner* — Kyu Chae
(74) *Attorney, Agent, or Firm* — Fenwick & West LLP

(57) ABSTRACT

A computer implemented method enables presenting interesting and informative preview video of a video content item in a digital magazine. The method comprises steps of receiving a video content item from a content provider, e.g., a 2-minute video advertisement for a car from an advertiser, and analyzing the video content item. The video content item is segmented into multiple segments based on the analysis, e.g., scene changes detected with the video frames of the video content item. One or more segments are selected, e.g., based on their associated visual quality, and are combined to generate a preview video, e.g., a 10-second long video highlighting new features of the car. One or more transition segments can be added between segments to enhance user experience with the preview video. The preview video is provided to a client device for display and auto playback.

16 Claims, 4 Drawing Sheets

(51) Int. Cl.
*H04N 21/45* (2011.01)
*H04N 21/234* (2011.01)
*H04N 21/81* (2011.01)

(56) References Cited

U.S. PATENT DOCUMENTS

| | | | |
|---|---|---|---|
| 2005/0055632 A1* | 3/2005 | Schwartz | G06F 17/211 |
| | | | 715/201 |
| 2007/0100891 A1* | 5/2007 | Nee | G06F 17/30817 |
| 2008/0019610 A1* | 1/2008 | Matsuzaka | G06K 9/00711 |
| | | | 382/284 |
| 2009/0097572 A1 | 4/2009 | Connery et al. | |
| 2015/0026279 A1* | 1/2015 | Casanova | H04L 51/10 |
| | | | 709/206 |
| 2015/0049093 A1* | 2/2015 | Doll | G06T 13/80 |
| | | | 345/473 |
| 2015/0205817 A1* | 7/2015 | Kottomtharayil | G06F 17/30174 |
| | | | 707/635 |
| 2015/0222919 A1* | 8/2015 | Licata | H04N 19/513 |
| | | | 375/240.16 |
| 2016/0055381 A1* | 2/2016 | Adsumilli | G06K 9/00751 |
| | | | 386/241 |
| 2016/0070962 A1* | 3/2016 | Shetty | G06K 9/00718 |
| | | | 382/225 |

OTHER PUBLICATIONS

Office Action for U.S. Appl. No. 15/064,384, filed Jun. 2, 2017, 25 Pages.
Office Action for U.S. Appl. No. 15/064,384, filed Oct. 7, 2016, 20 Pages.

\* cited by examiner

AUTO VIDEO PREVIEW WITHIN A DIGITAL MAGAZINE

CROSS REFERENCE TO RELATED APPLICATIONS

This application is a continuation of U.S. application Ser. No. 15/064,384, filed on Mar. 8, 2016, the disclosure of which is hereby incorporated by reference in its entirety.

BACKGROUND

This disclosure relates generally to providing digital content to users of an online system, and more specifically to providing automatic video preview of video content within a digital magazine.

Digital distribution channels disseminate a wide variety of digital content including videos, text, images, audio, links, and interactive media (e.g., games, collaborative content) to users. A user of a digital magazine application can view videos and play videos on content pages of a digital magazine. Conventionally, before a video being played back by a user, the video is presented to the user for preview in one or more static images, e.g., video frames selected from the video or reduced-size version of the video frames (also commonly referred to as "thumbnails" or "thumbnail images"). However, videos often contain dynamic and interesting content, e.g., an exciting football game having a lot of exciting movements of players. Presenting video content in static thumbnail images to users on content pages of a digital magazine may render the video content less representative, less accurate and less attractive. Furthermore, statically presenting video content by static thumbnail images, e.g., a video advertising a new car, is not effective for content providers, e.g., car manufacturers and advertising agency, to effectively advertise their products or services because the static thumbnail images of the video do not vividly represent the interesting and dynamics of the video content.

SUMMARY

Embodiments of the invention provide one or more preview videos generated from a source video for display on content pages of a digital magazine. A preview video generated from a source video provides interesting and representative information about the source video, e.g., a 10-second preview video generated from a 2-minute video advertisement for a car, where the preview video show highlights of new features of the car. To select a good preview video for the source video, the source video is analyzed and segmented into multiple segments based on the analysis, e.g., based on detected scene changes within the video frames of the source video. Each segment of the source video can have a score indicating the visual quality of the segment. Examples of visual quality indicators include content richness, video frame quality, objects of interest (e.g., having specifically defined human or object in video frames), sound quality (e.g., quality of people speaking) of the source video. One or more segments are selected and combined to generate the preview video. Different segments can be selected based on, e.g., selection schema, preview video duration, video genre, etc. The selected segments can be filtered to exclude uninteresting video frames from the segments, e.g., video frames having low sound or low movement in the video frames. One or more transition segments can be added between segments to provide smooth transition and to enhance user experience with the preview video.

To serve different client devices having different characteristics such as different processing capabilities, different connection speeds with a digital magazine server over a network, multiple preview videos can be generated from a same source video. For example, multiple preview videos from a same source video are generated, each of which is for a different display resolution of the client devices, e.g., 480p, 720p, 1080p and 2160p. A preview video is provided to a client device for display and auto playback. For example, without an explicit play action from a user of the digital server, the preview video is automatically played for the user while the user view the content page displaying the preview video. In response to a click of the preview video from the user, the source video is presented to the user for further interaction.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION OF THE FIGURES

Example Digital Magazine System Environment

One embodiment of a disclosed configuration is a system (or a computer implemented method or a non-transitory computer readable medium) for providing preview videos generated from corresponding source videos and presenting the preview videos on content pages to users of digital magazines.

A "digital magazine" herein refers to an aggregation of digital content items that can be presented to users in a presentable format similar to the format used by print magazines. A "content item" herein refers to any machine-readable and machine-storable work product, such as videos, pictures/images, textual articles, advertisements, user-generated content (e.g., content posted on a social networking system), and any other types of digital content capable of display within the context of a digital magazine. In one embodiment, a digital magazine assembles a list of universal resource locators (URLs), where each video, image or textual article of the digital magazine is based on the content of a resource on the Internet to which a URL of the list of the URLs references to. A "preview video" for a source video refers to a video generated from the source video, which includes a portion or all of the source video and provides interesting and representative information about the source video. A preview video generated from a source video can be different from the source video in various ways, including, e.g., different length, frame rate, bit rate, sampling rate, resolution, encoding/decoding scheme, media format, and sound quality. A preview video can be automatically played back on a content page of a digital magazine for a user of the digital magazine without an explicit playback action by the user.

Figure 1:
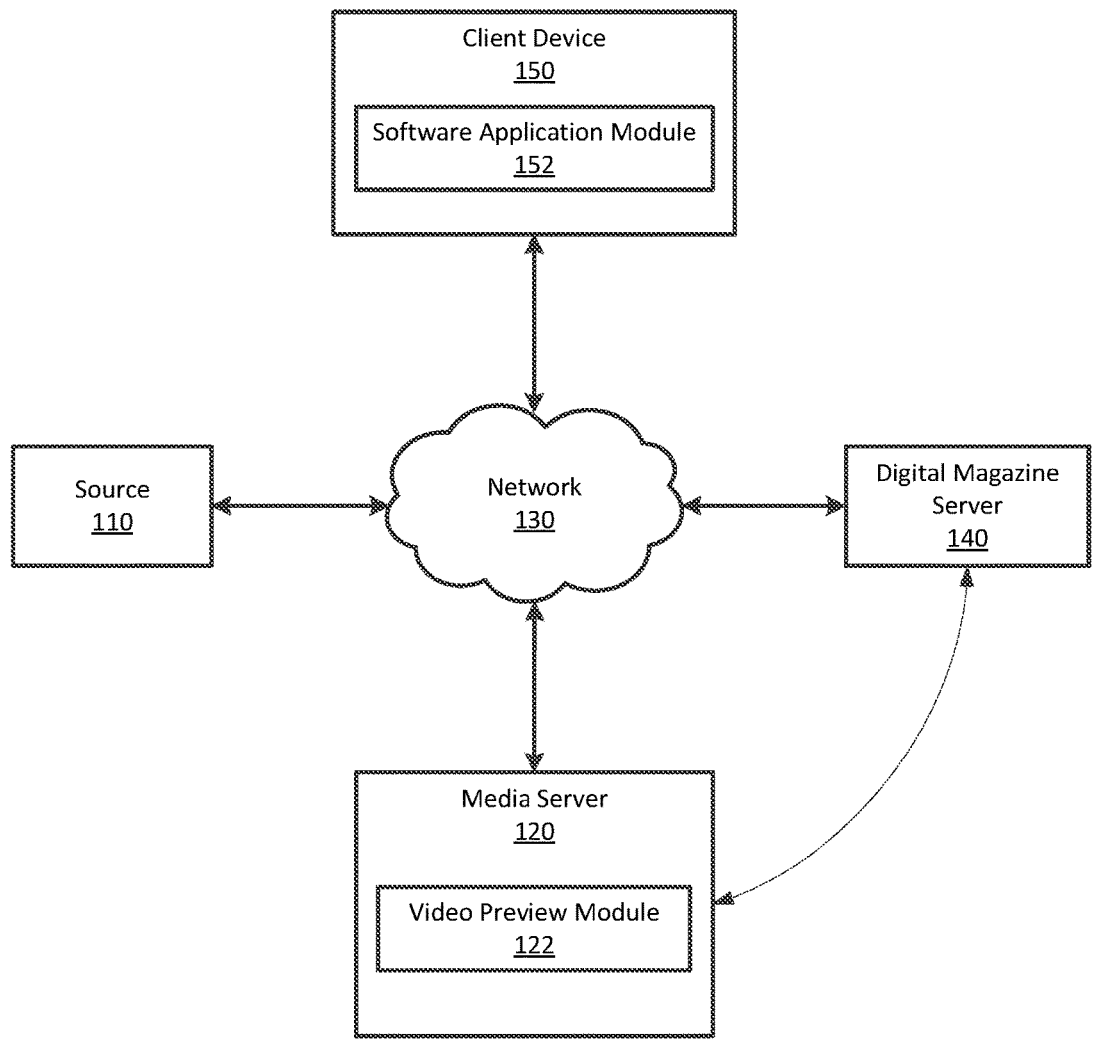
FIG. 1 is a block diagram of a system environment for providing preview videos for display in a digital magazine, according to one embodiment.

FIG. 1 is a block diagram of a system environment 100 for providing preview videos for display in a digital magazine, according to one embodiment. The system environment 100 shown in FIG. 1 includes a source 110, a media server 120, a digital magazine server 140, a client device 150 and a network 130. Only one source 110, one media server 120, one digital magazine server 140 and one client device 150 are shown in FIG. 1 in order to simplify the description. Embodiments of the system environment 100 can have multiple sources 110, media servers 120, digital magazine servers 140 and client devices 150 connected through the network 130. Likewise, the functions performed by the various entities of FIG. 1 may differ in different embodiments. The embodiments described herein can be adapted to online systems that are not digital magazine servers 140.

A source 110 is a computing system capable of providing various types of digital content to a client device 150 and to a digital magazine server 140. Examples of content provided by a source 110 include video, text, images, or audio on web pages, web feeds, social networking information, messages or other suitable digital data. Additional examples of content include user-generated content such as blogs, tweets, shared images, audios or videos, social networking posts and social networking status updates. Content provided by a source 110 may be received from a publisher and distributed by the source 110; alternatively, a source 110 may be the publisher that generates content. For convenience, content from a source 110, regardless of its composition, is referred to herein as a "content item". A content item may include various types of content elements such as text, image, audio, video, interactive media, links and a combination thereof.

The digital magazine server 140 is a computer system that receives content items from one or more sources 110 or provided by users of the digital magazine server 140, generates pages in a digital magazine by processing the received content, and provides the pages to the client device 150 or provides instructions to the client device 150 to generate pages in a digital magazine. In one embodiment, the digital magazine server 140 receives a video content item and a request for a preview video of the video content item to the media server 120. The media server 120 generates the requested preview video from the video content item, where the preview video provides interesting and representative information about the video content item. The digital magazine server 140 instructs a digital magazine application executed on the client device 150 to display and automatically play back the preview video on a content page of the digital magazine. In response to a detection of a user clicking any part of a display of the preview video, the digital magazine server 140 instructs the digital magazine application to pause the playing of the preview video and to display the video content item. For simplicity, the video content item from which a preview video is generated is referred to as a "source video." Other embodiments of the digital magazine sever 140 include additional or different modules, e.g., a search module for searching requested video content.

The source 110, the digital magazine server 140, the media server 120 and the client device 150 communicate with each other via the network 130. The network 130 may comprise any combination of local area and/or wide area networks, using both wired and/or wireless communication systems. In one embodiment, the network 130 uses standard communications technologies and/or protocols. For example, the network 130 includes communication links using technologies such as Ethernet, 802.1, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

The media server 120 is a computer system that processes requests based on network protocols, e.g., HTTP. In one embodiment, the media server 120 links the digital magazine server 140 via the network 130 to the client device 150, as well as to the source 110. The media server 120 serves web pages as well as other digital content to the digital magazine server 140, and communicates instructions to the client device 150 for generating pages of content items in a suitable presentation style and format for presentation to a user of the client device 150. In the embodiment shown in FIG. 1, the media sever 120 includes a video preview module 122, which is further illustrated with reference to description of FIG. 3. In the embodiment shown in FIG. 1, the media server 120 is a network entity separate from the digital magazine server 140. In other embodiments, the media server 120 is an entity of the digital magazine server 140.

The client device 150 is a computing device capable of receiving user input as well as transmitting and/or receiving digital data from the source 110 or the digital magazine server 140 via the network 130. Various embodiments of the client device 150 include a conventional computer system, such as a desktop or a laptop computer, and a device having computer functionality, such as a personal digital assistant (PDA), a mobile telephone, a smartphone or another suitable device. In one embodiment, the client device 150 executes an application allowing a user of the client device 150 to interact with the digital magazine server 140. For example, an application executing on the client device 150 communicates instructions or requests for content items to the digital magazine server 140. The client device 150 also executes a browser that receives pages from the digital magazine server 140 and presents the pages to a user accessing the client device 150. In another embodiment, the client device 150 interacts with the digital magazine server 140 through an API running on a native operating system of the client device 150, such as IOS® or ANDROID™.

Different client devices 150 may have different characteristics such as different processing capabilities, different connection speeds with the digital magazine server 140 over the network 130, and different device types (e.g., make, manufacture, and version). For example, in one embodiment, a client device 150 includes a display device (not shown) and an input device (not shown). A display device included in the client device 150 presents content items to a user of the client device 150. An input device included in the client device 150 receives input from a user of the client device 150. The user input is processed by a digital magazine application executing on the client device 150 to allow the user to interact with content items presented by the digital magazine server 140.

In the embodiment of FIG. 1, the client device 150 includes a software application module 152. Other embodiments of the client device 150 may include different or additional modules, other than those shown in FIG. 1, e.g., a graphics resource module for monitoring usage of graphics resources of the client device 150. The software application module 152 of the client device 150 receives from the digital magazine server 140 a preview video generated from a corresponding source video and presents the preview video on a content page of a digital magazine to a user of the digital magazine. In one embodiment, the software application module 152 executes a digital magazine application to display the preview video generated from the source video and to automatically, and repeatedly play back the preview video on the content page until the user clicking the preview video. The software application module 152 also monitors user interactions with the preview video and notifies the digital magazine sever 140 upon detection of user interactions, e.g., a mouse click on the display of the preview video. Upon detection of user clicking on the display of the preview video, which indicates the user's interest in the source video, the software application module 152 pauses the auto playback of the preview video and presents the source video on the content page to the user.

Examples of Presenting Video Content Pages of a Digital Magazine

Figure 2:
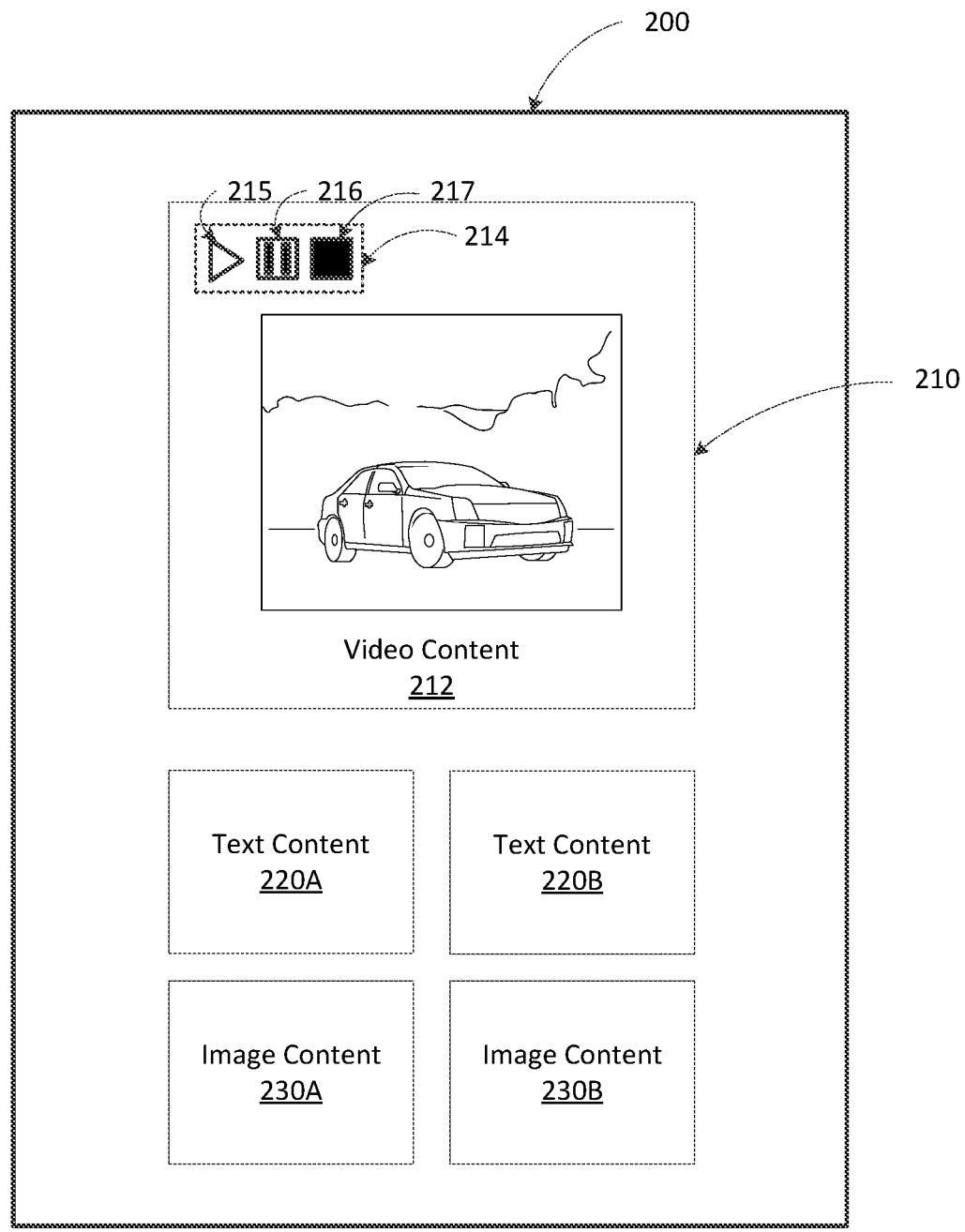
FIG. 2 is an example digital magazine page with a video content item presented on a display of a client device, according to one embodiment.

FIG. 2 is an example digital magazine page 200 with a video content item presented on a display of a client device 150, according to one embodiment. In the embodiment shown in FIG. 2, the digital magazine page 200 includes one or more content slots for presenting different content items on the page 200 to a user according to a page layout template. A page template includes one or more content slots, and each slot is for presenting one or more content items. For example, a content slot in a page layout template is used to present a video while another slot in the page layout template is used to present an image. Each content slot has a size (e.g., small, medium, or large) and an aspect ratio. For example, the content slot 210 is for presenting a video content item 212 (e.g., a source video or a preview video generated from the source video), the content slots 220A and 220B are for presenting text content items such as textual articles, blogs or user-generated posts, and the content slots 230A and 230B are for presenting image content items such as static pictures and user-uploaded photos. In alternative embodiments, additional or fewer content slots for presenting content items in different formats such as videos, audio, texts or images can be shown on the digital magazine page 200.

In one embodiment, the content slot 210 further includes an interface bar 214, which includes one or more interaction tools to allow users to interact with the video content item 212 displayed in the content slot 210. In the embodiment shown in FIG. 2, the interface bar 214 includes a play button 215, a pause button 216 and a stop button 217. The play button 215 is configured for users to play the video content item 212 from beginning or from a pause state. The pause button 216 is configured for users to pause the playing of the video content item 212. The stop button 217 is configured for users to stop the playing of the video content item 212. In alternative embodiments, the interface bar 214 of the content slot 210 may include additional or fewer interaction tools for users to interact with the video content item 212.

In one embodiment, to offer different control over user interactions with the video content item 212 displayed in the content slot 210, the interface bar 214 can be configured to be visible or invisible for display depending on which video content item 212, a source video or a preview video generated from the source video, is displayed in the content slot 210. For example, if a source video is being displayed in the content slot 210 for a user of the digital magazine, e.g., a 10-second long video advertisement for a car, the interface bar 214 is visible for display, which allows the user to interact with the source video such as playing back, pausing or stopping the source video.

On the other hand, if a preview video generated from a source video is being displayed in the content slot 210 for a user of the digital magazine, e.g., a 5-second long video generated from a 10-second long video advertisement for a car, showing new features of the car, the interface bar 214 is invisible for display, which allows auto playback of the preview video without an explicit play action by the user. In response to a click on any part of the display of the preview video from the user, the video content being displayed is switched to the source video and the interface bar 214 is visible to allow the user to interact with the source video.

In another embodiment, the content slot 210 includes a visible interface bar 214 regardless which video content item 212, a source video or a preview video generated from the source video, is being displayed in the content slot 210, which allows the user to interact with the video content being displayed in the content slot 210. For example, a playback button or a similar indicator is displayed on the interface of the preview video, indicating that a full video (i.e., the source video) will start to play once the preview video is clicked or tapped. As shown in FIG. 2, the video content item 212 presented in the content slot 210, e.g., a source video or a preview video generated from the source video, is represented by a current video frame of the video content, i.e., a car picture, associated with the playing back of the video content. For the content items presented in the content slots on a digital magazine page such as the page 200 shown in FIG. 2, video content items may have file formats such as MP4, WMV, MOV, AVI and other suitable video file formats.

Example Video Preview Module

The media server 120 receives content items from one or more sources 110 or provided by the digital magazine server 140 or users of the digital magazine server 140, generates pages in a digital magazine by processing the received content, and provides the pages to the client device 150 or provides instructions to the client device 150 to generate pages in a digital magazine. In one embodiment, the media server 120 receives a video content item and generates a preview video from the video content item by a video preview module, where the preview video is presented on a content page of a digital magazine, e.g., the page 200 shown in FIG. 2. The preview video is generated so that it provides interesting and representative information about the video content item. A preview video generated from a source video includes a portion or all of the source video, e.g., some or all video frames of the source video. A preview video generated from a source video can be different from the source video in various ways, including, e.g., different length, frame rate, bit rate, sampling rate, resolution, encoding/decoding scheme, media format, and sound quality.

Figure 3:
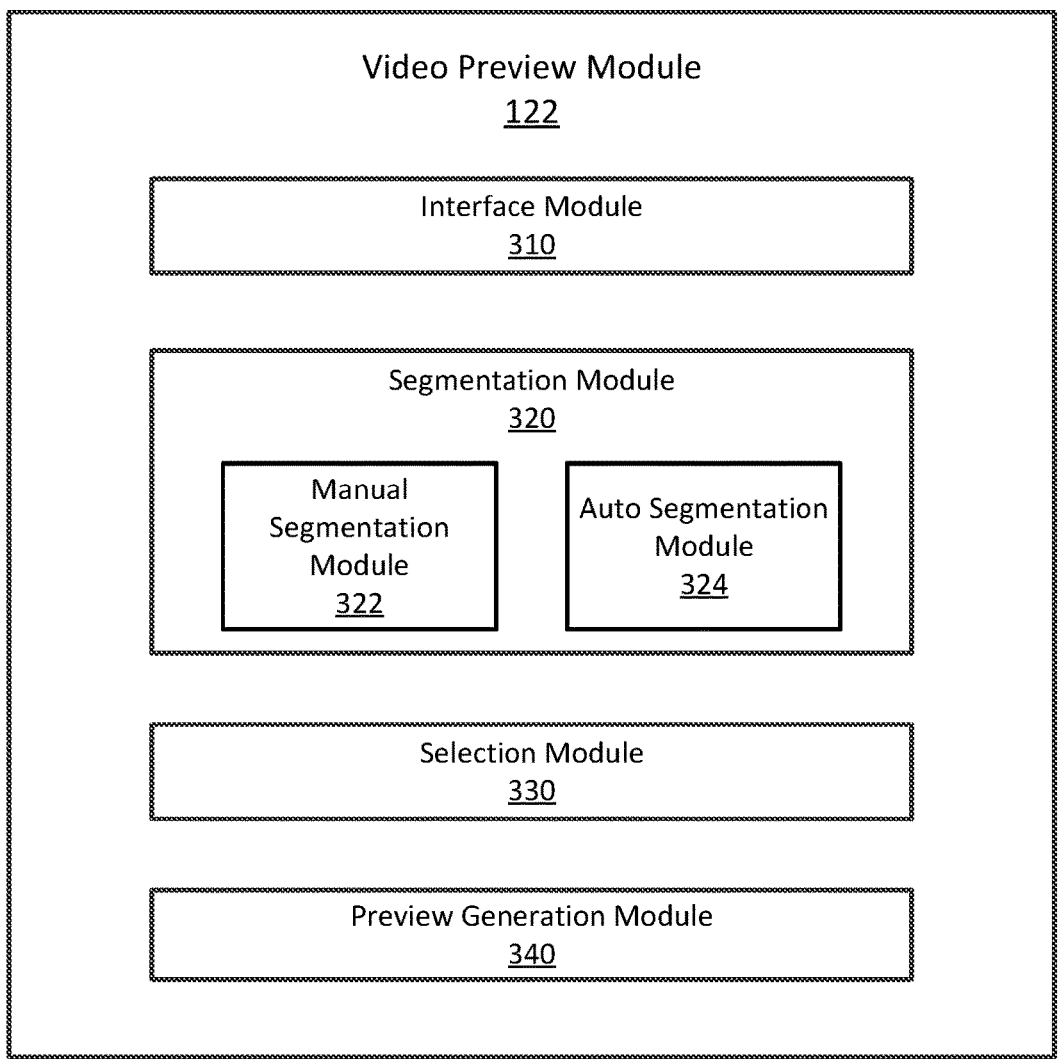
FIG. 3 is an example block diagram of a video preview module, according to one embodiment.

FIG. 3 is an example block diagram of a video preview module 122 of the media server 120 for generating a preview video from a source video, according to one embodiment. In the embodiment of FIG. 3, the video preview module 122 includes an interface module 310, a segmentation module 320, a selection module 330 and a preview generation module 340. In alternative embodiments, additional or fewer components can be shown in the video preview module 122.

The interface module 310 receives a source video from a user of the digital magazine server 140, e.g., an advertiser or a media content publisher, and extracts metadata associated with the source video. In one embodiment, the metadata associated with the source video includes information describing the source video such as media format of the source video (e.g., MP4), length of the source video (e.g., in terms of seconds or number of video frames), frame rate (e.g., 24 frames per second), bit rate (e.g., 2000 Kbits/second for 720 progressive videos), sampling rate (e.g., 4:2:0 for video pixels in YCbCr color space and 44.8 kHz for DVD sound), resolution (e.g., 1024×768 pixels), encoding/decoding scheme (e.g., H.264), source of the source video (e.g., a sports channel), genre or type of the source video (e.g., a sports video, a news or movie), and sound quality (e.g., CD audio or DVD audio).

The interface module 310 provides the received source video and its associated metadata to other modules of the video preview module 122 to generate a preview video from the source video. In one embodiment, the interface module 310 provides the received source video and its associated metadata to the segmentation module 320 for segmenting the source video into multiple portions. In response to receiving instructions on how to segment the source video from the user who provides the source video, e.g., segmenting the source video by the boundaries of predefined group of pictures of the source video, the interface module 310 provides the received source video, associated metadata and corresponding instructions to the segmentation module 320 for further processing.

Upon receiving a preview video generated by the preview generation module 340, the interface module 310 provides the preview video or the content page for presenting the preview video and instructions on how to play back the preview video to the user's client device 150. The client device 150 automatically plays back the preview video on the content page of a digital magazine without an explicit playback action from the user. In response to a notification of user clicking the preview video from the client device 150, the interface module 310 instructs the client device 150 to pause the auto playback of the preview video and to present the source video on the content page to the user.

The segmentation module 320 receives a source video and associated metadata from the interface module 310 and segments the source video into multiple portions or segments. In the embodiment shown in FIG. 3, the segmentation module 320 includes a manual segmentation module 322 and an auto segmentation module 324. In other embodiments, the segmentation module 320 can include additional and/or different modules than the ones shown in FIG. 3.

The manual segmentation module 322 segments the source video into one or portions according to instructions provided by the user, who provides the source video, e.g., an advertiser. Because the provider of the source video is generally expected to know the video content best and how the video content is captured by various video frames of the source video, the instructions from the provider of the source video guide the manual segmentation module 322 on how to segment the source video into multiple segments. Example instructions include segmenting the source video into multiple groups of pictures, and each group of pictures includes just one intra frame (also referred to as I-frame), where the intra frame is generally not compressed or compressed less than other types of video frames, such as bi-directional predicted frames (also referred to as B-frames) or predicted frames (as referred to as P-frames). Another example of instructions include segmentation boundaries for a specified portion of the source video, e.g., the portion starting at $10^{th}$ second, ending at $30^{th}$ second of the source video, or the portion beginning with $100^{th}$ frame and ending with $164^{th}$ frame of the source video. The instructions may further include ordering information to combine multiple portions of the source video segmented by the manual segmentation module 322.

The auto segmentation module 324 segments the source video according to a variety of segmentation criteria. Examples of segmentation criteria include detected scene changes within the source video, volume changes of audio of the source video, human and object detection within the video frames of the source video, motion detection within the video frames of the source video, visual quality of the video frames of the source video, color information of the video frames of the source video, byte size of each video frame or segment and combination of thereof. The auto segmentation module 324 selects one or more segmentation criteria, and for each selected segmentation criterion, the auto segmentation module 324 segments the source video into multiple segments according to the selected criterion and generates a score for each segment based on the visual quality of the segment. The auto segmentation module 324 may further rank the segments based on the scores associated with the segments.

Taking scene detection criterion as an example, the auto segmentation module 324 analyzes the source video and detects shot transition between sections of the source video, e.g., by comparing visual content of video frames of the source video. Responsive to a detection of change of visual content of a video frame from its temporally consecutive video frame, the auto segmentation module 324 groups the video frames prior to the detected change as a segment and the remaining video frames as another segment. The auto segmentation module 324 can continue detecting additional scene changes among the remaining video frames and further segments the remaining video frames into additional segments. For each segment, the auto segmentation module 324 determines a scene associated with the segment, e.g., based on the common visual features of the video frames within the segment. Among segments having similar scenes, the auto segmentation module 324 assigns a higher score to a segment having better visual quality than other segments.

The selection module 330 selects one or more segments of the source video to be included in the preview video, where the selected segments of the source video provide interesting and representative information about the source video. In one embodiment, the selection module 330 selects segments having higher scores. In another embodiment, the selection module 330 selects multiple segments, each of which represents a difference scene of the source video. In yet another embodiment, the selection module 330 selects video frames of the source video using a lower sampling rate than the one associated with the source video.

To make the preview video more attractive, the selection module 330 applies one or more filters to candidate segments to be included in the preview video, where the filtering excludes uninteresting video frames from the candidate segments. In one embodiment, video frames having low movement, e.g., a human talking head without much body movement, low sound volume, are considered uninteresting. Multiple temporally consecutive video frames having slow inter-frame activity can also be excluded. The selection module 330 provides the selected portions of the source video and ordering information, e.g., timestamp of the video frames of the selected portions of the source video, to the preview generation module 340 to generate the preview video.

The preview generation module 340 combines the segments of the source video selected by the selection module 330 to generate a preview video. In one embodiment, the preview generation module 340 combines the selected segments of the source video according to the timestamps associated with the segments to generate the preview video. It is noted that the selected segments of the source video may represent different scenes of the source video, e.g., segment 1 for a new feature of a sound system of a car, segment 2 for a new feature of auto parking of the car. A preview video generated by directly combining the selected segments according to their timestamps may not be continuous in terms of smoothness between scenes, which may degrade the user experience with the preview video.

To enhance user experience with the preview video, the preview generation module 340 adds smooth transition between segments. In one embodiment, the preview generation module 340 generates the smooth transition between two segments by adding gradual transition from the last video frame of the first segment to the first video frame of the second segment. The preview generation module 340 can use video editing techniques, such as linear or non-linear video editing, to create the gradual transition (e.g., fade-in or fade-out visual effect). For example, using non-linear video editing technique, the preview generation module 340 interpolates gradually between color values of each pixel of the last video frame of the first segment to create the smooth transition.

In one embodiment, the preview generation module 340 generates multiple preview videos from a same source video. Each preview video is different from each other in one or more ways. Multiple preview videos are to serve different client devices 150. As described with reference to FIG. 1 above, different client devices 150 may have different characteristics such as different processing capabilities, different connection speeds with the digital magazine server 140 over the network 130. In one embodiment, the preview generation module 340 generates multiple preview videos, each of which is for a different display resolution of the client devices 150, e.g., 480p, 720p, 1080p and 2160p. In another embodiment, the preview generation module 340 generates multiple preview videos, each of which is for a different network connection speed of the client devices 150. For example, for a client device 150 having a slow network connection speed, the preview generation module 340 generates a preview video with video frames sampled at a lower frame rate than for a client device 105 having a higher network connection speed.

After the preview video is generated, the preview generation module 340 generates a content page for presenting the preview video in a digital magazine such as the content page 200 shown in FIG. 2. In one embodiment, the preview video can be presented in an animated graphics interchange format (GIF). In another embodiment, to reduce the file size of the preview video, the preview video is presented in a video format, such as MP4. The preview video generation module 340 provides the generated preview video to the interface module 310, which provides the preview video and/or content page to the client device 150 for display.

Figure 4:
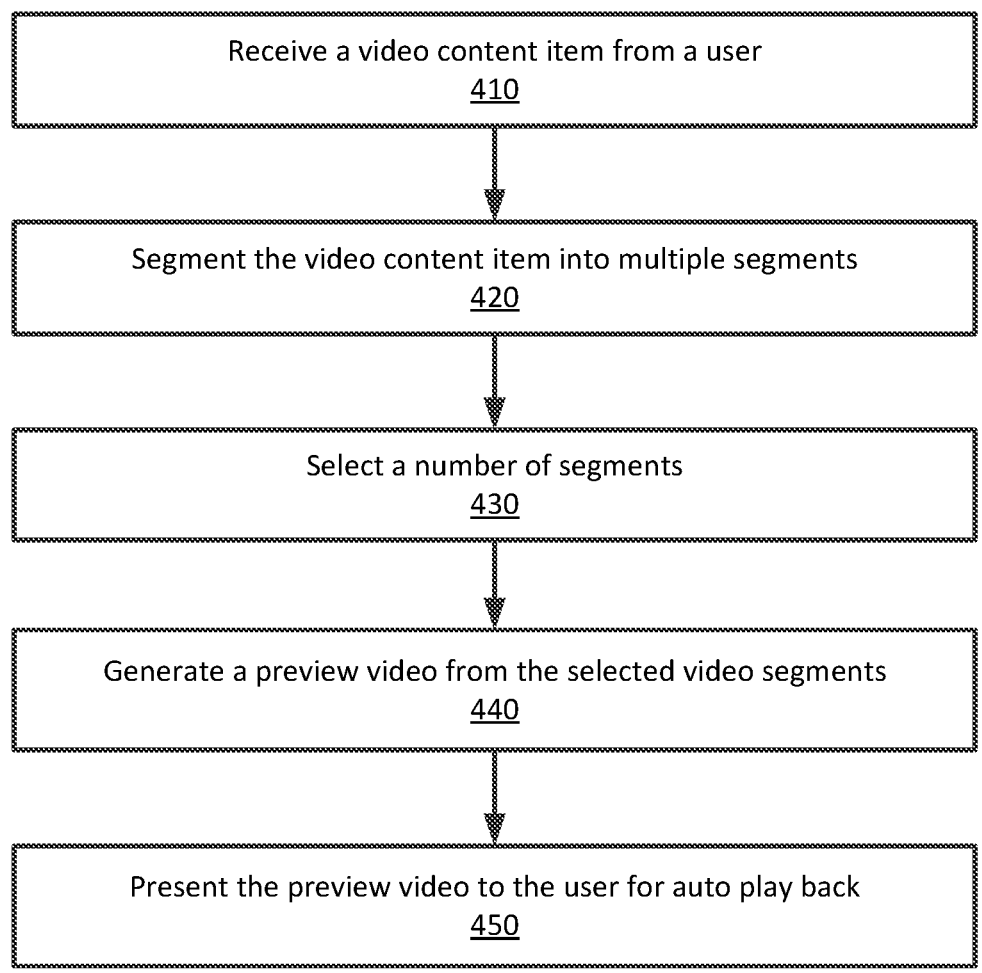
FIG. 4 is a flowchart illustrating a process of generating a preview video from a source video, according to one embodiment.

FIG. 4 is a flowchart illustrating a process of generating a preview video from a source video, according to one embodiment. Initially, the video preview module 122 receives 410 a video content item from a user of the digital magazine server 140, e.g., a 2-minutes video advertisement for a car from an advertiser. The video preview module 122 segments 420 the video content item into multiple segments manually or automatically. For example, responsive to instructions on how to segment the video content item from the provider of the video content item, the video preview module 122 manually segments the video content item according to the received the instructions. The video preview module 122 can also analyze the video content items to identify interesting portions and dynamics of the content of the video content item, e.g., scene changes, volume changes of sound, detection of human or object. Based on the analysis, the video preview module 122 automatically segments the video content item into one or more segments.

To assess the quality of the segmentation, the video preview module 122 assigns a score to each segment based on visual quality of the segment. The video preview module 122 can rank the segments based on their associated scores. The video preview module 122 selects 430 a number of segments to be included in the preview video, e.g., based on the ranking of the segments. The video preview module 122 generates 440 the preview video by combining the selected segments according to the timestamps of the segments. To enhance user experience with the preview video, the video preview module 122 can add smooth transition between segments, e.g., add fade-in effect between the two segments. The video preview module 122 presents 450 the preview video to the user of the digital magazine server 140 for auto playback.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method, comprising:
receiving a video content item from a content provider for display on a content page of a digital magazine on a client device, the video content item having a plurality of video frames;
segmenting the video content item into a plurality of segments according to one or more segmentation criteria, each segment presenting a portion of the video content item;
selecting one or more segments from the plurality of segments of the video content item;
filtering the selected segments to exclude video frames having an amount of movement below a threshold value;
generating a preview video by combining the filtered segments according to timestamps of the selected segments, the preview video providing representative information about the video content item, wherein generating the preview video comprises:
responsive to a first segment and a second segment of the selected segments having different visual content, adding a gradual transition segment from visual content of the first segment to visual content of the second segment, the gradual transition segment generated by interpolating between color values of each pixel of a last video frame of the first segment and each pixel of a first video frame of the second segment, wherein the transition segment adds the gradual transition from the visual content of the first segment to the visual content of the second segment; and
presenting the generated preview video for display on the content page of the digital magazine on the client device.

2. The method of claim 1, wherein generating the preview video further
comprises:
determining a frame rate for sampling video frames of the preview video based on a characteristic of the client device.

3. The method of claim 1, wherein segmenting the video content item comprises:
extracting a plurality of metadata from the video content item, the plurality of metadata providing information about the video content item.

4. The method of claim 1, wherein the one or more segmentation criteria comprise at least one of:
scene changes detected within the video frames of the video content item;
volume changes of sound of the video content item;
human face or an object detected within the video frames of the video content item;
visual quality of the video frames of the video content item;
size of each segment; and
amount of movement among the video frames of the video content item.

5. The method of claim 1, wherein segmenting the video content item comprises:
selecting at least one segmentation criterion; and
segmenting the video content item into the plurality of segments according to the selected segmentation criterion.

6. The method of claim 1, wherein segmenting the video content item comprises:
detecting one or more scene changes within the video frames of the video content item; and
grouping video frames before a detected scene change into a first segment and video frames after the detected scene change into a second segment.

7. The method of claim 1, wherein segmenting the video content item comprises:
receiving instructions on how to segment the video content item from the content provider; and
segmenting the video content item according the received instructions.

8. The method of claim 1, further comprising:
generating a plurality of preview videos from the received video content item, each preview video of the plurality video being generated according to a characteristic of a target client device, and the preview video generated according to the characteristic of the target client device being suitable for display on the target client device.

9. A non-transitory computer-readable storage medium storing computer program instructions, the computer program instructions when executed by a computer processor causes the processor to perform steps of:
receiving a video content item from a content provider for display on a content page of a digital magazine on a client device, the video content item having a plurality of video frames;
segmenting the video content item into a plurality of segments according to one or more segmentation criteria, each segment presenting a portion of the video content item;
selecting one or more segments from the plurality of segments of the video content item;
filtering the selected segments to exclude video frames having an amount of movement below a threshold value;
generating a preview video by combining the filtered segments according to timestamps of the selected segments, the preview video providing representative information about the video content item, wherein generating the preview video comprises:
responsive to a first segment and a second segment of the selected segments having different visual content, adding a gradual transition segment from visual content of the first segment to visual content of the second segment the gradual transition generated by interpolating between color values of each pixel of a last video frame of the first segment and each pixel of a first video frame of the second segment and the gradual transition segment adds the gradual transition from the visual content of the first segment to the visual content of the second segment; and presenting the generated preview video for display on the content page of the digital magazine on the client device.

10. The computer-readable storage medium of claim 9, wherein generating the preview video further comprises:
   determining a frame rate for sampling video frames of the preview video based on a characteristic of the client device.

11. The computer-readable storage medium of claim 9, wherein segmenting the video content item comprises:
   extracting a plurality of metadata from the video content item, the plurality of metadata providing information about the video content item.

12. The computer-readable storage medium of claim 9, wherein the one or more segmentation criteria comprise at least one of:
   scene changes detected within the video frames of the video content item;
   volume changes of sound of the video content item;
   human face or an object detected within the video frames of the video content item;
   visual quality of the video frames of the video content item;
   size of each segment; and
   amount of movement among the video frames of the video content item.

13. The computer-readable storage medium of claim 9, wherein segmenting the video content item comprises:
   selecting at least one segmentation criterion; and
   segmenting the video content item into the plurality of segments according to the selected segmentation criterion.

14. The computer-readable storage medium of claim 9, wherein segmenting the video content item comprises:
   detecting one or more scene changes within the video frames of the video content item; and
   grouping video frames before a detected scene change into a first segment and video frames after the detected scene change into a second segment.

15. The computer-readable storage medium of claim 9, wherein segmenting the video content item comprises:
   receiving instructions on how to segment the video content item from the content provider; and
   segmenting the video content item according the received instructions.

16. The computer-readable storage medium of claim 9, further comprising:
   generating a plurality of preview videos from the received video content item, each preview video of the plurality video being generated according to a characteristic of a target client device, and the preview video generated according to the characteristic of the target client device being suitable for display on the target client device.

* * * * *